May 2, 1967
N. FORREST
3,316,592
APPARATUS FOR MAKING CAST PLASTIC FABRIC-LIKE MATERIAL
Filed July 10, 1964
2 Sheets-Sheet 1
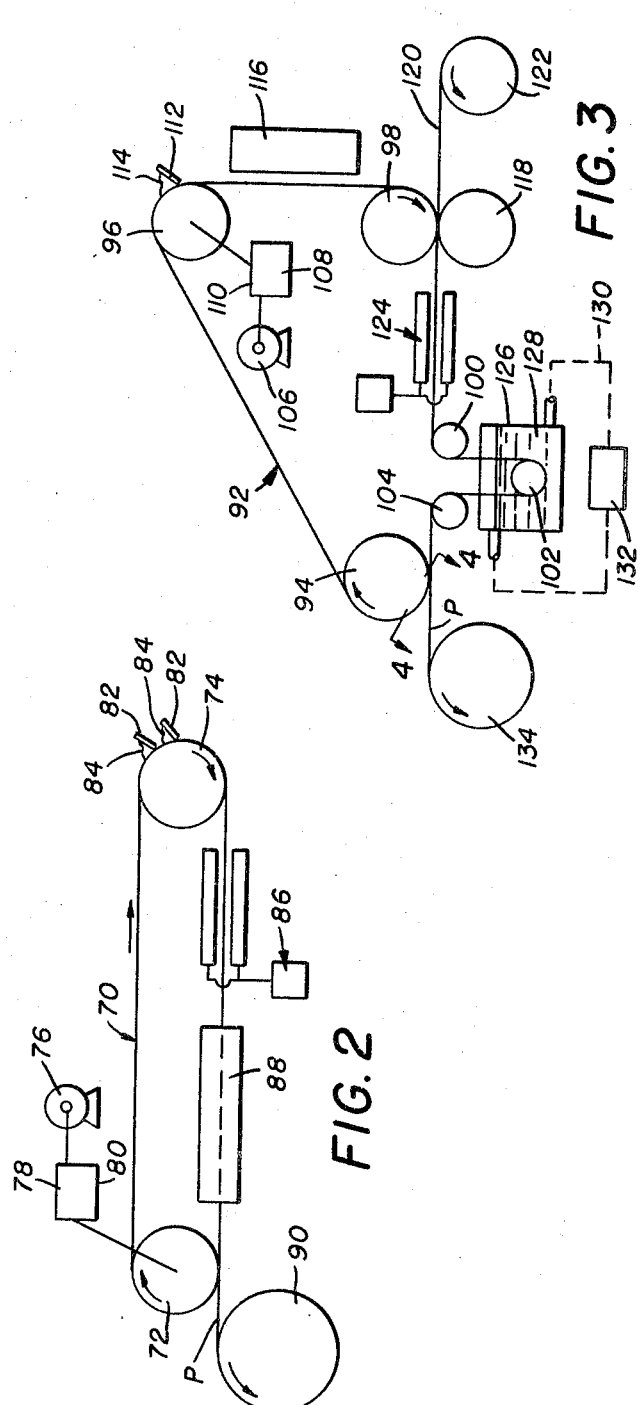
INVENTOR.
NORMAN FORREST
BY
Oldham & Oldham
ATTORNEYS May 2, 1967  N. FORREST  3,316,592
APPARATUS FOR MAKING CAST PLASTIC FABRIC-LIKE MATERIAL
Filed July 10, 1964  2 Sheets-Sheet 2
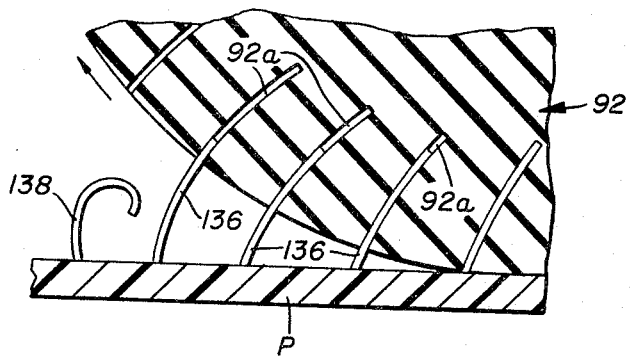
FIG. 4
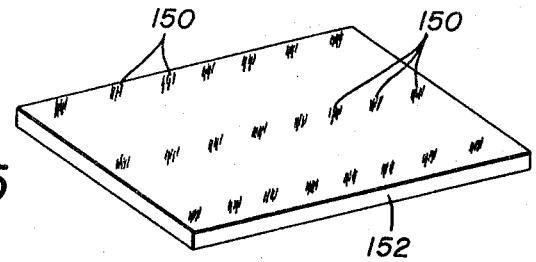
FIG. 5
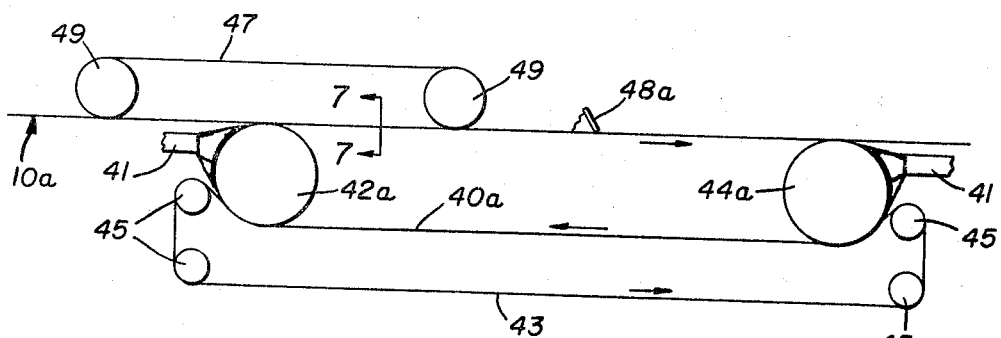
FIG. 6
FIG. 7
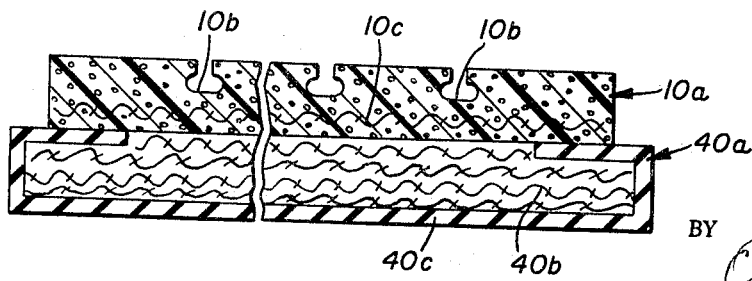
INVENTOR.
NORMAN FORREST
BY
*Oedham & Oedham*
ATTORNEYS

United States Patent Office 3,316,592
Patented May 2, 1967

3,316,592
APPARATUS FOR MAKING CAST PLASTIC
FABRIC-LIKE MATERIAL
Norman Forrest, 216 Byram Road,
Byram, Conn. 10573
Filed July 10, 1964, Ser. No. 381,691
4 Claims. (Cl. 18—15)

This invention relates to apparatus for making, preferably, continuously, from vinyl and similar plastics a wide variety of fabric like materials including carpeting, hides, velvets, mohairs, and other fabrics.

It is the general object of the invention to provide relatively inexpensive readily operated and performed apparatus for inexpensively and usually continuously making from plastic durable and beautiful fabric reproductions or simulations.

Another object of the invention is the provision of apparatus of the character described wherein dielectric heating of the cast plastic is effected by means of high frequency radiant energy whereby the molding time is kept to a minimum to thereby speed up production and yet effect complete curing of the plastic.

Another object of the invention is the provision of apparatus of the character described wherein the plastic to be cast is applied in the casting mold in the presence of ultrasonic vibrations whereby better to effect the complete filling of the mold with plastic.

Another object of the invention is the provision of apparatus of the type described wherein the plastic is cast in a rubber mold which is distorted during the casting operation so as to better allow the plastic to be introduced into the mold.

Another object of the invention is the provision of apparatus of the character described wherein after the plastic has been cast and cured the temperature thereof is kept within a selected range so that when the plastic is progressively stripped from the casting mold the plastic is strained and distorted to effect a permanent setting of at least portions thereof to thereby apply a curl to tufts or fibers of the cast plastic to improve the appearance or wear of the cast plastic.

The foregoing objects of the invention, and other objects which will become apparent as the description proceeds, are achieved by the provision of apparatus for making plastic reproductions of carpet, fabric and similar web materials including an endless, conveyor belt-shaped, flexible, rubber-like mold of a width equal to the material to be reproduced and having a molding contour complementary to the surface of the material to be reproduced, means for supporting and continuously advancing the mold, means for bending the mold around an arc to increase the area of the openings in the molding contour of the mold, squeegee-like means for wiping a plastic into the openings of the molding contour, ultrasonically vibrating the squeegee-like means during the wiping operation, dielectric heating means for at least partially curing the plastic wiped into the mold, driven endless belt means for supporting an area of the mold in its movement, squeegee means in the area of the belt means for applying at least one additional coat of plastic to that already on the mold, means for selectively curing the plastic, means for selectively cooling the plastic, means for controllably and progressively stripping the molded plastic from the mold to effect a selective permanent distortion of the plastic as it is pulled from the mold, and means for winding up the plastic.

For a better understanding of the invention reference should be had to the accompanying drawings wherein:

FIGURE 1 is a diagrammatic side elevation of a typical apparatus incorporating the principles of the invention;

FIGURE 2 is a view similar to FIGURE 1 but of a modification of the apparatus of FIGURE 1;

FIGURE 3 is a view similar to FIGURES 1 and 2 but of a further modification of the apparatus of the invention;

FIGURE 4 is an enlarged fragmentary cross sectional view taken substantially on line 4—4 of FIGURE 3 and illustrating the controlled stripping of the cast article from the mold;

FIGURE 5 is a perspective view illustrating the use of a magnetic chuck for making a mold for casting tufted articles;

FIGURE 6 is a view of a portion of FIGURE 1 including the belt 40, but illustrating a modification of the invention; and FIGURE 7 is an enlarged cross sectional view taken on line 7—7 of FIGURE 6.

As heretofore stated the method and apparatus of the present invention preferably utilizes an endless belt-like rubber mold of the type disclosed and claimed in applicant's U.S. patent application filed May 18, 1962 under Ser. No. 195,869 and entitled "Method of Making a Mold for Copying Fabric, Lace, Matting and Similar Materials." In FIGURE 1 of the drawings of the present application the numeral 10 indicates generally a continuous mold of the type identified in the aforesaid patent application, with the endless mold 10 being mounted on rolls 12, 14, 16, 18 and 20 in the manner illustrated in FIGURE 1. One or more of these rolls can be driven by means of a motor 22 operating through a gear box 24 having an adjustable speed control 26.

One of the features of the invention is that the mold 10 is distorted at its molding face to facilitate the introduction of the molding plastic into the mold openings in the mold. One manner of achieving this distortion is by the use of the rolls 14, 16 and 18 positioned as shown so that as the mold 10 moves over the outer periphery of the roll 16 the mold openings in the mold are stretched to provide somewhat larger areas. It will be recognized in this connection, and as more fully described in applicant's above-identified earlier application, that the rubber mold 10 made from a tufted carpet, a brocaded fabrics, and the like will have undercut portions in the mold or long fiber-like passages in the mold which must be filled with plastic in order to get the proper molded reproduction. The distortion of the rubber mold 10 in the manner described achieves a better filling of the mold with plastic in many instances than would be possible with the mold not being distorted.

Positioned in association with the roller 16 so as to apply the plastic into the mold as it is bent around the roll 16 is a squeegee blade 28 positioned down into engagement or substantially into engagement with the surface of the mold 10 and carrying a bank 30 of plastic between the surface of the mold and the squeegee blade, all in known manner so that as the mold passes continuously under the squeegee blade the plastic 30 is wiped into the mold openings and over the surface of the mold. One of the features of the invention is that the squeegee blade 28 is adapted to be ultrasonically vibrated by mechanism 32 during the operation to thereby further enhance the introduction of the plastic 30 into the mold openings to the full depth thereof in the manner desired.

With the mold 10 moving in the direction of the arrows shown after the plastic 30 has been applied to the mold 10 it passes between the plates 34 of a dielectric heating apparatus energized at high frequency with radiant energy from mechanism 36 so as to fully or partially cure the plastic 30 cast in the mold 10.

Next the mold 10 is passed over a table 38 having an endless belt 40 sliding on the table and carried by rolls 42 and 44, at least one of which may be driven by a shaft 46 extending from the gear reducer 24. By use of the endless belt 40 sliding on the table 38 any friction between the mold 10 and the table 38 is substantially eliminated. One or more additional coatings of plastic can be applied to the mold 10 as it moves over the table 38, and to this end additional squeegee bars 48 and 50 are provided for laying on an additional coat of plastic from each of the banks 52 and 54. The squeegee bars 48 and 50 are preferably ultrasonically vibrated by mechanisms 56 and 58.

After leaving the second and third squeegee operations described the mold 10 passes under or through further heating or curing means indicated as a whole by the numeral 60, and this may be a bank of infra-red radiant-heat lights in one embodiment of the invention for the reason that this heating means is concerned with curing up the layers of plastic applied to the outer surface rather than down into the mold openings.

After leaving the heating means 60 the molded product P is stripped from the mold 10 in the region of the roll 20 and with the product P being wound up on suitable roll means 62. The mold 10 after passing around roll 20 may be passed through a cooling chamber 64 and on back to the beginning of the operation so that with the continuous endless mold 10 the operation is a continuous one.

In the embodiment of the invention of FIGURE 1 the squeegee bar 28 is normally utilized to place the plastic 30 down into the openings in the mold 10 with substantially no surface coat of plastic on the mold. The squeegee bar 48 applies the plastic 52 as a coat of the desired thickness over the entire surface of the mold and joins together all of the plastic introduced into the mold openings by the squeegee bar 28. The squeegee bar 50 applies a coating of foamible plastic 54 to the outer surface of the plastic so that when the complete laminate is cured up to form the finished product P an excellent reproduction of a fabric-like or carpet-like material is made having a foam back of a desired thickness. It should be understood that scrim or other fabric could be incorporated into the laminate as a strengthening means or backing before the final curing operation, that the laminate can be made with or without the foam backing layer, all as desired in a finished product P.

Turning now to FIGURE 2 of the drawings, this illustrates an endless rubber molding belt indicated as a whole by the numeral 70 and of the type disclosed and claimed in applicant's aforesaid patent application. The endless rubber mold 70 is carried on rolls 72 and 74, which may be driven at a selected speed by a motor 76 operating through a gear box 78 having a speed control 80 thereon. Squeegee bar means 82 are positioned in association with roll 74 to apply one or more coatings of plastic 84 to the mold 70 as it is turned around the roll 74. High frequency radiant energy heating means indicated as a whole by the numeral 86 are provided for curing up the plastic applied to the mold. After leaving the curing means 86 the mold and plastic passes through a temperature control chamber 88 and the finished product marked P is stripped from the mold 70 adjacent the roll 72 and is wound up at 90.

The embodiment of the invention shown in FIGURE 3 includes an endless rubber belt-like mold 92 of the type disclosed and claimed in applicant's previously filed and above-identified application, the endless mold 92 being carried on rolls 94, 96, 98, 100, 102 and 104. One or more of these rolls can be driven as by a motor 106 operating through a gear box 108 and having a speed control 110 thereon. As the mold 92 passes around the roller 96 squeegee means 112 of any of the types heretofore described is adapted to apply a plastic 114 to the mold and after leaving the squeegee bar 112 suitable heating means 116 are utilized to at least partially cure the plastic on the mold. As the mold and plastic passes around the roll 98 an additional pressure roll 118 may be utilized to press into the plastic heated by the means 116, a strengthening scrim or textile material 120 supplied from a roll 122. The laminate now passes through radiant energy heating means indicated as a whole by the numeral 124 for effecting the curing up of the laminate, and the mold and laminate thereon is now passed through a temperature control bath 126 containing liquid 128 which is circulated through the tank in a system 130 having temperature control means 132 in the system so that the bath of liquid 128 can be maintained at substantially the desired temperature, usually a cool temperature to bring the plastic carried by the mold 92 to a desired temperature as the mold and plastic leave the tank 126. FIGURE 3 does not show the tank 126 to be very large, but it should be recognized that this tank in an actual installation will be made of the necessary size to achieve the desired temperature control of the molded and cured plastic.

The finished product P is stripped from the mold 92 adjacent the underside of roll 94 and is wound up at 134. A feature of the invention is the controlled stripping of the product P from the mold 92 in a manner described. This can be best understood from a consideration of FIGURE 4 wherein the rubber mold 92 is illustrated in cross section as having fiber-like openings 92a therein into which the plastic has been pressed in the manner heretofore described. Now as the plastic fibers indicated by the numeral 136 are pulled out of the mold openings 92a the fiber 136 can be stretched and permanently distorted i.e. cold worked beyond the elastic limit of the plastic so that when the fibers are released from the mold openings they will assume a distorted curl position shown by the fiber 138. The temperature of the liquid 128 can be adjusted, with or without change of speed of the gear reducer 108, with the fibers 136 on the finished product P being examined under a magnifying glass so as to give a desired curl or distortion to the fibers in the finished product which remains permanently therein to give an improved appearance, a different appearance, or a shape to the product better adapting it to wear or other particular purposes.

It will be understood that in the discription of FIGURE 4 that this is by way of example only and that the same permanent distortion can be thrown into a finished product in which the fibers 136 are positioned more as tufts or clumps, and with the undercutting of the tufts or clumps effecting the same distorting or cold working action described in conjunction with the fibers 136.

FIGURE 5 illustrates the method of making a mold to produce a tufted plastic carpet and the like which includes the steps of cutting small diameter wires into a plurality of relatively short pieces having a length about equal to the height of the tufts desired. In FIGURE 5 these short pieces of wire are indicated by the numeral 150. The wires 150 are assembled into separate piles on a de-energized magnetic chuck 152, the piles being spaced apart substantially as the tufts are to be spaced in the molded product. The magnetic chuck is now at least partially energized to cause each of the wires to stand vertically or substantially vertically on the chuck in the manner shown in FIGURE 5. Apparently the wires 150 align themselves in the direction of the lines of magnetic flux projecting from the chuck 152 and stand, as indicated, substantially vertically from the surface of the chuck instead of being pulled down to lie flat against the chuck as might be expected.

The wires 150 are now manually moved by a hand held tool, such as a pair of brass tweezers to arrange the wires more particularly into the tufts desired, to provide for proper spacing between the tufts and between the individual wires in each tuft. The energizing of the chuck is continued or it is fully energized if it has been only partially energized before, and now a body of flowable, curable rubber, usually in liquid form, is poured over the surface of the chuck and around the tufts of wires. To hold the rubber liquid in position on the chuck the sides of the chuck may be built up with a frame (not shown) to prevent the liquid rubber from flowing off of the surface of the chuck and to give the desired thickness to the rubber mold. The rubber is now cured, usually by the application of heat thereto, as in an autoclave, or by having previously compounded in the liquid rubber a self curing agent. Once the rubber is properly cured it is stripped from the wires and the chuck, and thereafter the chuck 152 is de-engerized. Should any of the wires 150 be carried with the rubber mold in the stripping operation, these can be plucked out of the mold with a pair of pliers.

The resulting mold is then employed to cast plastic therein, either as a continuous belt, in the manner set forth heretofore, or is used in a batch molding operation in the form of a plate mold.

In the modified form of the invention shown in FIGURES 6 and 7, the belt 40 of FIGURE 1 is formed as a vacuum conveyor. One manner of achieving this is to provide an endless carrier belt 40a having an air-porous fabric carcass 40b surrounded by air impervious rubber 40c at the bottom and edges of the belt and extending over on the top of the edges of the belt. Such a vacuum belt can then be used in conjunction with a molding belt 10a, having mold cavities or openings 10b, and reinforcing fabric 10c. The body of the molding belt 10a is made of open-celled rubber so that when vacuum is applied to the fabric body 40b of the carrier belt 40a this vacuum is applied also to the molding belt 10a and to the cavities 10b thereof through the open cells of the molding belt body to help draw into the cavities 10b the plastic applied to the molding belt 10a by the usual squeegee bar 48a.

The vacuum is applied to the carrier belt 40a by evacuated hoods 41 adjacent the rolls 42a and 44a, and to prevent the loss of vacuum an air imprevious belt 43 carried on rolls 45 seals off the lower and end reaches of the carrier belt 40a. A similar air-impervious belt 47 on rollers 49 may be mounted to seal off the upper surface of the molding belt 10a in advance of the squeegee bar 48a. The plastic applied to the molding belt 10a by the squeegee bar 48a seals off the vacuum in the molding belt after passing the squeegee bar.

The invention is adapted to the making of lace and like articles, as well as the tufted or fibrous articles already described. In the case of lace and like articles the plastic is wiped down into the mold cavities only and leaving the rest of the mold surface bare whereby upon curing of the plastic the open network lace is produced. On the other hand, in the making of the fabric and tufted articles the plastic is wiped down into the mold openings and in addition a layer of plastic is provided over the entire mold surface to provide a finished product having tufts or fibers connected with an integral backing.

In the operation of the apparatus described, and the performance of the method, various castable plastic materials can be utilized. Among the best of the plastics now available commercially are polyvinyl plastisols. This material can be compounded to provide a wide variety of cured or fused physicals ranging from very soft and flexible to relatively hard and stiff, is adapted to pigmenting to beautiful colors, and is adapted to some loading with fillers, so that the end product can best perform the desired use and at a price competitive with or less expensive than available materials.

It is also possible to use known hot melt types of plastic with the apparatus and methods of the invention. In this event the squeegee bars are heated or the plastic pools formed behind the squeegee bars are heated to keep the plastic hot and liquid so that the liquid plastic can be pushed or wiped into the mold, usually warmed by infra-red lamps placed in advance of the squeegee bars, followed by cooling of the belt and plastic and the stripping of the cooled plastic from the mold.

Further, the invention may employ catalizable plastics, such as epoxys, urethanes, polyesters, and the like, wherein the curing up of the plastic is preferably speeded by the application of heat.

While a certain representative embodiment and details have been shown for the purpose of illustrating the invention, it will be apparent to those skilled in this art that various changes and modifications may be made therein without departing from the spirit or scope of the invention.

What is claimed is:

1. Apparatus for making plastic reproductions of carpet, fabric and similar web materials including an endless, conveyor belt-shaped, flexible, rubber-like mold of a width equal to the material to be reproduced and having a molding contour with openings therein complementary to the surface of the material to be reproduced, means for supporting and continuously advancing the mold, means for bending the mold around an arc to increase the area of the openings in the molding contour of the mold, means for wiping a plastic into the openings and over the surface of the molding contour in the area where the mold is bent around an arc, means for curing the plastic, and means for stripping the plastic from the mold and for winding it up.

2. Apparatus for making plastic reproductions of carpet, fabric and similar web materials including an endless, conveyor belt-shaped, flexible, rubber-like mold of a width equal to the material to be reproduced and having a molding contour surface complementary to the surface of the material to be reproduced, means for supporting and continuously advancing the mold and for continuously bending a portion of the mold around an arc and exposing the molding contour surface, means for progressively wiping a plastic into any openings of the molding contour surface and over such surface in portions of the mold when bent to arc shape, means for controllably curing the plastic in the mold and to establish the plastic at a selected temperature, and means for controllably and progressively stripping the molded plastic while substantially at the selected temperature from the mold so as to stretch the molded plastic with cold working beyond the elastic limit to effect a selectable permanent distortion of the plastic as it is pulled from the mold, and means for winding up the plastic.

3. Apparatus for making plastic reproductions of carpet, hides, tufted fiber, fabrics and similar materials including a flexible, rubber-like mold of a width equal to the material to be reproduced and having a surface with a molding contour complementary to the surface of the material to be reproduced and with openings therein, means for supporting and advancing the mold, means engaging the mold for bending it to increase the volume of the openings in the molding contour of the mold as the mold is advanced thereover, means for wiping a plastic into the openings of the molding contour of the mold when such openings are of increased volume and over the surface of the molding contour, means for ultrasonically vibrating the wiping means during the wiping operation, means for curing the plastic, and means for stripping the plastic from the mold.

4. Apparatus for making plastic reproductions of carpet, hides, tufted fiber, fabrics and similar materials including a flexible, rubber-like mold of a width equal to the material to be reproduced and having a surface with a molding contour complementary to the surface of the material to be reproduced and with openings therein, means for supporting and advancing the mold, means engaging successive portions of the mold for bending such portions around an arc to increase the volume of the openings in the molding contour of the mold as the mold is advanced thereover, means for forcing a liquid plastic into the openings of the molding contour of the mold when such openings are of increased volume, the plastic covering the molding contour surface of the mold, means for solidifying the plastic, and means for stripping the plastic from the mold.

References Cited by the Examiner

UNITED STATES PATENTS

| | | | |
|---|---|---|---|
| 798,642 | 9/1905 | Wadsworth. | |
| 1,157,149 | 10/1915 | Conger | 18—15 |
| 1,453,747 | 5/1923 | Carey | 25—99 |
| 1,726,511 | 8/1929 | Henry et al. | |
| 2,297,504 | 9/1942 | Salvaneschi | 18—15 X |
| 2,413,735 | 1/1947 | Shabaker | 25—99 |
| 2,525,135 | 10/1950 | Huff | 18—21 |
| 2,678,081 | 5/1954 | Rainard et al. | |
| 2,712,154 | 7/1955 | Lindquist | 18—15 |
| 2,954,587 | 10/1960 | Rasmussen | 264—23 |
| 3,026,566 | 3/1962 | Martelli et al. | 18—21 X |
| 3,098,262 | 7/1963 | Wisotsky | 18—26 X |
| 3,116,349 | 12/1963 | Immel | 18—4 X |
| 3,124,840 | 3/1964 | Taylor | 18—21 |
| 3,166,615 | 1/1965 | Farrell | 264—23 |

WILLIAM J. STEPHENSON, *Primary Examiner.*